Oct. 3, 1944.  F. T. POWERS  2,359,582
CASSETTE
Filed Feb. 8, 1943  3 Sheets-Sheet 1

INVENTOR.
Frank T. Powers
BY
ATTORNEY

Oct. 3, 1944.  F. T. POWERS  2,359,582
CASSETTE
Filed Feb. 8, 1943  3 Sheets-Sheet 2
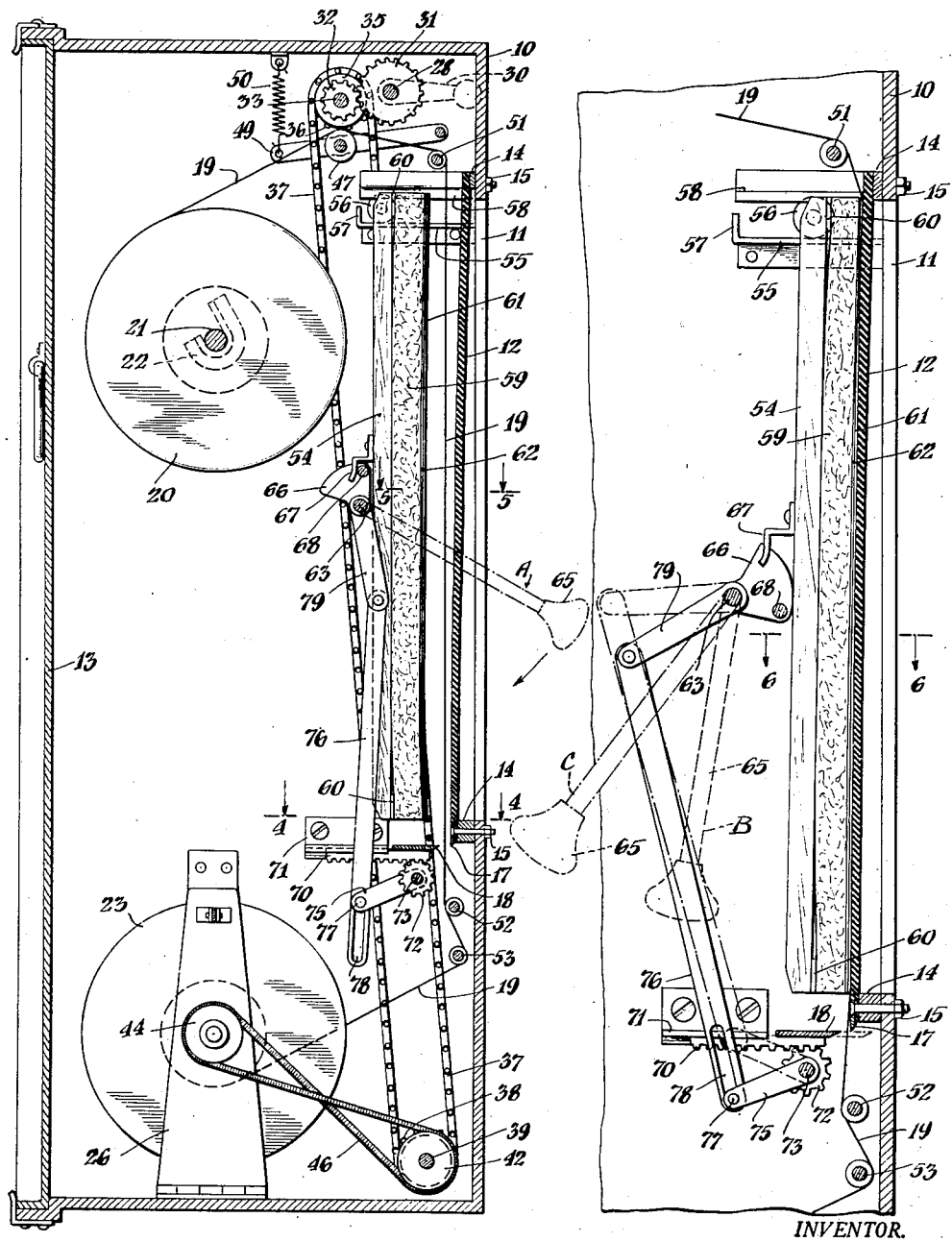
INVENTOR.
Frank T. Powers
BY
ATTORNEY Oct. 3, 1944.  F. T. POWERS  2,359,582
CASSETTE
Filed Feb. 8, 1943  3 Sheets-Sheet 3
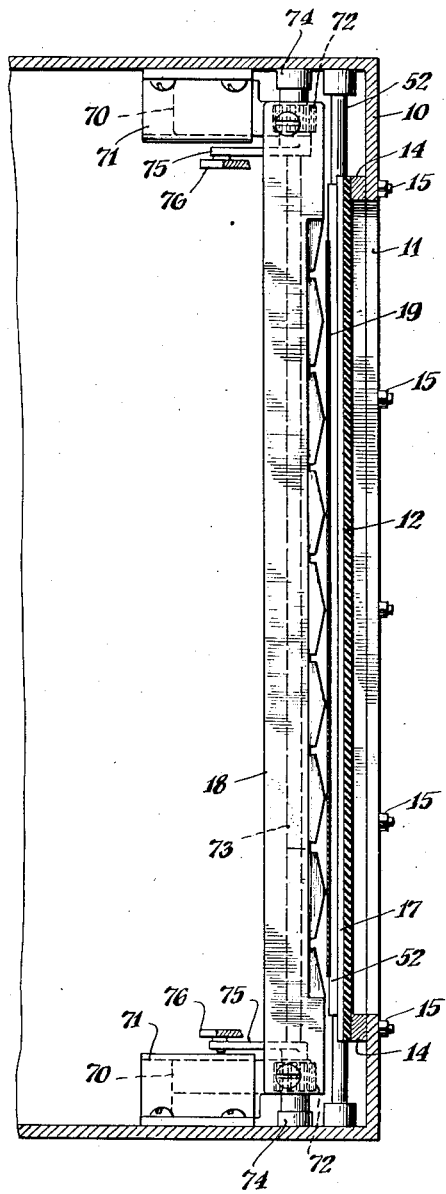
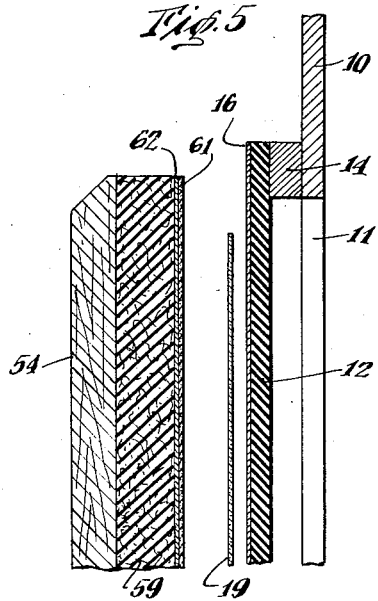
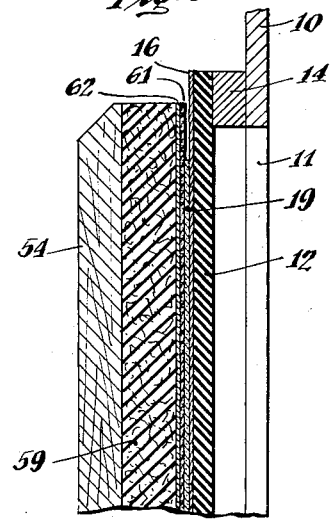
INVENTOR.
Frank T. Powers
BY
ATTORNEY Patented Oct. 3, 1944

2,359,582

UNITED STATES PATENT OFFICE 2,359,582

CASSETTE

Frank T. Powers, Glen Cove, N. Y.

Application February 8, 1943, Serial No. 475,061

4 Claims. (Cl. 250—66)

This invention relates to cassettes for X-ray radiography, more particularly, cassettes with provision for handling and exposing successive lengths of a long strip of ray sensitive materials.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 2 is a view in section taken along the line 2—2 of Figure 1 showing parts as they would appear with the strip of ray sensitive material unclamped;

Figure 3 is a fragmentary view similar to Figure 2 but with the strip clamped;

Figure 4 is a view in section taken along the line 4—4 of Fig. 2 and particularly showing details of the strip cutting means;

Figure 5 is a fragmentary view in section taken along the line 5—5 of Figure 2 showing parts as they would appear with the strip unclamped; and, Figure 6 is a fragmentary view in section taken along the line 6—6 of Figure 3 showing parts as they would appear with the strip clamped.

Figure 1:
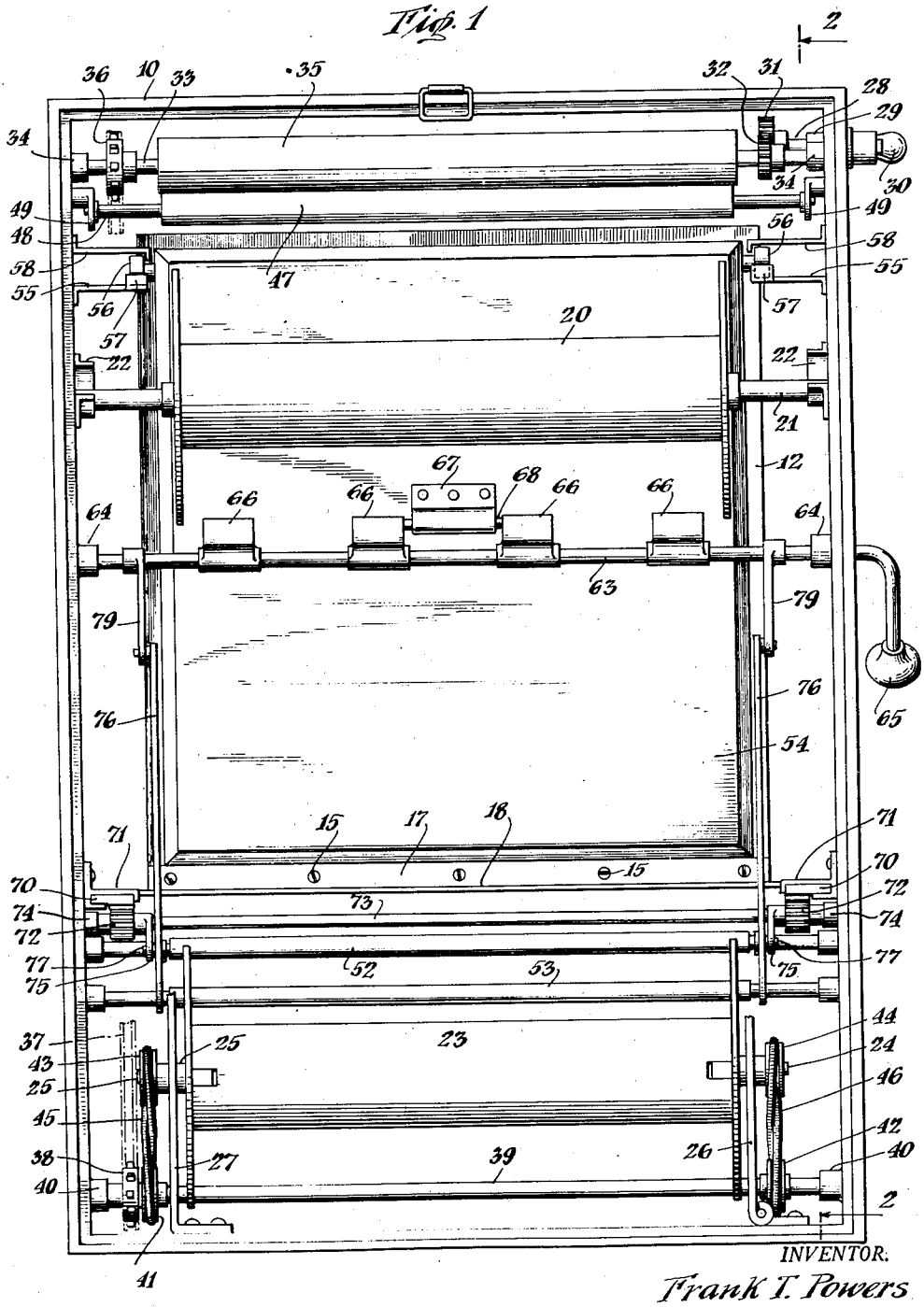
Figure 1 is a view in rear elevation of a cassette constituting an illustrative embodiment of this invention showing the interior of the cassette.

Objects of this invention are to provide a new and improved cassette for X-ray radiography; to provide a cassette having provision for handling and exposing successive lengths of a long strip of sensitized paper or other X-ray sensitive material, which will hold a length of the strip in the exposure position in such fashion that it will be free of buckles and will present a smooth and even surface to the X-ray beam over the entire exposure area; to provide a cassette having provision for contacting a length of a strip of X-ray sensitive material during exposure with an intensifying screen and for effecting the obtainment of intimate contact between the ray sensitive material and the intensifying screen during exposure; and to provide a cassette having provision for cutting an exposed length of a strip of X-ray sensitive material with which it is loaded so as to permit detaching of the exposed length from the strip when desired.

To the accomplishment of the foregoing ends and objects, there is provided in accordance with this invention a casing having an X-ray permeable window through which successive lengths of a long strip of X-ray sensitive material are adapted to be exposed to the X-rays. The window is of substantially rigid construction and preferably possesses a slight and preferably uniform curvature in a direction corresponding to the lenghwise direction of the strip.

Means are provided for clamping a length of the strip in the exposure position and in contact with an intensifying screen so that the clamped length will present a smooth, even, unbuckled surface to the X-ray beam and intimately contact the intensifying screen over the entire exposure area. The embodied clamping means comprises a yieldably mounted intensifying screen movable from outside the casing into and out of a predetermined clamping position in which it firmly presses the ray sensitive material against the rigid window over the entire exposure area. In this way, any buckles or warpage which may be present in the material within the exposure area are eliminated and intimate contact of the screen with the clamped length is obtained over the entire exposure area.

Means are provided for cutting the strip in order that an exposed length, or successive exposed lengths, of the strip may be readily detached from the strip when desired. The embodied strip cutting means may be independent of the strip clamping means and independently operable so that cutting of the strip may be effected either when the strip is clamped or unclamped. Preferably, the strip cutting means and the clamping means are suitably interlocked so as to permit cutting of the strip to take place only while the strip is clamped. By this arrangement, cutting of the strip is facilitated and the possibility of injuring the unexposed length of the strip is minimized since it is held against movement which the cutting member tends to impart during the cutting operation.

The foregoing brief description and the following detailed description as well are exemplary and explanatory of the invention but are not restrictive thereto.

Referring now more particularly to the embodiment shown in the accompanying drawings, a casing 10 is provided with an opening 11 in its front wall which is sealed by a substantially rigid and inflexible window member 12. The rear wall of the casing is formed by a removable member 13 providing access to the interior of the casing, the member 13 being suitably fitted to the top, bottom and side walls of the casing so as to ensure the provision of a light-tight structure. The interior of the casing except over the window member 12, is preferably lined with sheet lead (not shown) of suitable thickness to render the casing impervious to X-rays.

The window member 12 is permeable to X-rays, but opaque to light rays, and preferably possesses a slight though uniform curvature, preferably cylindrical, inwardly of the casing. For a purpose to be described more fully hereinafter, the window member 12 is mounted over the opening 11 in slightly spaced relation to the front wall of the casing. As here embodied, spacing members 14 are provided along the marginal portions of the window member between it and the casing, and bolts 15 located at suitably spaced intervals secure the window member 12, spacing members 14 and casing 10 to each other. It will be understood that suitable precautions may be taken to prevent the entry of X-rays through the spacing members 14 whose inner surfaces may be lead faced as will be understood by those skilled in the art. The inner face of the window member 12 is preferably covered with a grounded thin sheet 16 of aluminum which serves to filter X-rays passing through the window member and provides a surface to which static charges may be transferred from the strip of ray sensitive material and discharged through a ground (not shown). The bottom marginal portion of the window member 12 is suitably recessed to receive a stationary blade member 17 of strip cutting means to be more fully described hereinafter.

A fresh film magazine or supply in the form of a reel 20 for holding a long strip 19 of X-ray sensitive material is rotatably mounted in the upper part of the casing by means of a shaft 21 removably journalled at either end in a pair of identical U-shaped bearing members 22.

A used film magazine in the form of a take-up reel 23 is rotatably mounted in the lower part of the casing, being removably mounted on and between a pair of axially aligned stub shafts 24 and 25 by which the reel is to be driven.

The stub shafts 24 and 25 are journalled in standards 26 and 27, respectively. For convenience in depicting the construction and arrangement of the mechanism by which the knife blade 18 is actuated, the upper terminus of the standards 26 and 27 has been omitted from Figure 1. The particular construction of the standards 26 and 27 forms no part of the present invention but it is to be understood that the standard 26 is preferably of hinged construction so as to permit withdrawal of the stub shaft 24 from the reel 23 and removal of the reel 23 from the casing.

Means are provided for driving the take-up reel 23 from outside the casing. As here embodied, a shaft 28 extending through a side wall of the casing and journalled in a bearing member 29 carried thereby is equipped at its outer end with a crank 30 and at its inner end with a gear 31. The gear 31 operatively engages a smaller gear 32 on a parallel shaft 33 journalled at either end within the casing in bearing members 34. The shaft 33 carries a measuring roller 35 coextensive in width with the strip 19 and is equipped at the end opposite the crank end with a sprocket member 36.

The sprocket member 36 is operatively connected by a chain belt 37 with a sprocket member 38 of equal diameter carried on a shaft 39 located at the bottom of the casing and in parallel relation to the shaft 33.

The shaft 39 is journalled at either end in bearings 40 and is provided with a pair of pulleys 41 and 42 corresponding in diameter to the sprocket members 36 and 38. The pulleys 41 and 42 are located in aligned relation with a pair of pulleys 43 and 44, respectively, located at opposite ends of the reel 23 upon the stub shafts 25 and 24, respectively. Cross spring belts 45 and 46 operatively connect the sets of pulleys 41 and 43 and 42—44, respectively, to the end that a clockwise rotation of the crank 30, as viewed in Figure 2, will produce a clockwise rotation of the reel 23 at twice the crank speed.

A pressure roller 47 is carried on a shaft 48 in parallel relation to the measuring roller 35, the shaft 48 being journalled at either end in a pair of pivotally mounted spring pressed arms 49. Each of the arms 49 is hinged at its forward end to a side wall of the casing 10 and is connected at its opposite end by coil spring 50 to the top wall of the casing. The springs 50 normally urge the pressure roller 47 toward the measuring roller 35 so that the pressure roller 47 will lightly press the strip 19 against the measuring roller.

A guide roller 51 extending transversely of the casing above and rearwardly of the window member 12 and a pair of guide rollers 52 and 53 suitably located below the window member are provided for guiding the strip 19 vertically downwardly past the window member 12.

In loading the cassette with a fresh supply of ray sensitive material, the reel 20 upon which the strip 19 is wound in roll form, is placed in the bearings 22. The leading edge of the strip is passed between the rollers 35 and 45, thence over the guide roller 51, thence downwardly in back of the window member 12, thence between the guide rollers 52 and 53 and over the guide roller 53 rearwardly to the reel 23 to which it is fastened in the usual manner. If the crank 30 be now rotated clockwise, as viewed in Fig. 2, the feed rollers 35 and 47 will function in each revolution to draw a finite length of the strip from the reel 20. At the same time, the strip is wound onto the reel 23 which takes up the slack and imparts a substantially uniform tension to that portion of the strip between it and the rollers 35 and 47. To this end a certain amount of slippage is permitted of the crossed spring belts 45 and 46 upon their respective sets of pulleys 41—43 and 42—44. The shaft 33 may actuate a suitable counter (not shown) at the casing exterior for indicating what portion of the film strip has been used.

Means are provided for clamping a measured length of the film strip 19 in the exposure position and in contact with an intensifying screen so that the clamped length will present a smooth, even, unbuckled surface to the X-ray beam and intimately contact the intensifying screen over the entire exposure area. As here embodied, a clamping unit comprised of a rigid backing member or pressboard 54, preferably of laminated wood, is mounted for back and forth movement within the casing upon a track formed by a pair of rails 55 secured to the side walls of the casing in suitable fashion. Coaxial rollers 56 at either side of and adjacent the top of the backing member engage the rails 55 and provide an anti-friction carriage for supporting the backing member. In order to limit the extent of rearward travel of the backing member each of the rails 55 preferably terminates in an upstanding flange portion 57 providing a stop for the rollers 56. Likewise, lateral and upward movement of the backing member is minimized to the desired extent by flanged plates 58 each located above and in spaced parallel relation to one of the rails 55.

The rigid backing member 54 is faced with a mat 59 of yieldable, resilient material, such, for example, as sponge rubber. The mat 59 is secured in any suitable fashion, as by adhesive, to the backing member and is preferably shimmed out at its top and bottom so as to provide a good firm pressure against the curved window member 12. Shim members 60, which may be tapered or wedge shaped, are provided for the purpose.

An intensifying screen 61 (Figure 5) covers the front face of the mat 59 by which it is yieldably carried. In order to avoid any chemical action between the screen and mat and to minimize staining of the screen with cement, the screen is adhesively secured at its corners only to a thin sheet 62 of aluminum or other suitable metal which is adhesively bonded to the face of the mat over its entire contacting surface. The thin metal sheet 62 has the added function of preventing X-rays which pass through the screen 61 scattering around within the interior of the casing. Thus it acts as a shield.

A shaft 63 within the casing 10 extends transversely thereof and is journalled in bearings 64 in either side wall. One end of the shaft terminates in a handle 65 outside of the casing. A series of cam members 66, four in number, are carried by the shaft and are adapted to engage the rear face of the backing member 54 at suitably spaced points so that by clockwise movement of the handle 65, as viewed in Figure 1, the clamping unit will be moved from the position shown in Figure 2 into the clamping position shown in Figure 3.

A socket member 67 is secured to the rear face of the backing member 54 and forms therewith a substantially U-shaped socket adapted to receive a retracting bar 68 extending between and anchored at either end to the middle pair or the series of cam members 66. The arrangement of the socket member 67 and the retracting bar 68 is such that in the normally unclamped position of the clamping unit, as in Figure 1, the bar 68 is lodged in the socket formed by socket member 67. As the handle 65 is rotated clockwise, as viewed in Figure 2, the retracting bar 68 rotates therewith in an arc about the axis of the shaft 63, is withdrawn from the socket.

On the return movement, the retracting bar enters the socket, and by engaging the socket member retracts the clamping unit from the clamping position.

Means are provided for cutting the strip 19 while it is clamped. The embodied cutting means may, if desired, be so constructed and arranged as to sever the strip 19, but preferably merely imparts thereto a series of perforations so that while winding of the strip on the reel 23 is not interfered with, ready detachment of an exposed length, or lengths, may be made when desired. As here embodied, a perforating blade member 18 is secured at either end to rack members 70 each of which in turn is reciprocably mounted in one of a pair of guide members 71 respectively fastened to the casing side walls. Each of the rack members 70 is engaged by one of a pair of pinion gears 72 mounted on a transverse shaft 73 adjacent the ends thereof. The shaft 73 is journalled at either end in bearings 74 secured to the casing side walls and is provided with a pair of rearwardly extending lever arms 75.

Each of the lever arms 75 is slidably pivotally connected at its free end to a slotted link member 76 by means of a suitable pin member 77 slidably lodged in a slot 78 in the link member 76. The opposite end of each link member 76 is pivotally connected to one of a pair of lever arms 79 secured to the transverse shaft 63.

As an illustration of the operation of this invention, the cassette, loaded with a strip of sensitized paper or other suitable X-ray sensitive material as previously described, is positioned with the subject to be radiographed in front of the window member 12. The handle 65 is moved from the position A in Fig. 2 to the position B in Fig. 3. By this operation, the clamping unit is moved by the cam members 66 into and locked in the position shown in Fig. 3. In doing so, the measured length of strip 19 at the rear of the window member 12 is engaged by the intensifying screen 19 and pressed firmly against the window member over the entire exposure area. Because of the yieldable nature of the mat 59, the screen and the clamped length are caused to conform to the contour of the rigid window member 12. This has the effect of compressing the clamped length so as to eliminate any buckles therein and produce a uniform contact of the X-ray sensitive material with the intensifying screen.

By this same movement of the handle 65, the link members 76 have been moved relative to the lever arms 75 from the position shown in Fig. 1 to the solid line position shown in Fig. 3 without moving the cutting blade member 18. Exposure is now made and while the strip is still clamped, the handle 65 may, if desired, be moved to the position C shown in Fig. 3 so as to move the perforating blade member 18 forwardly to the dotted line position shown in Fig. 3 so as by coaction with the stationary blade member 17 to perforate the strip 19. The necessary space for forward movement of the cutting blade 18 is provided by the spacing of the window member 12 from the casing 10.

It will be observed that during the perforating operation, the strip 19 is held in a taut condition and perforation is accomplished in a more facile manner than if the strip were loose.

The clamping unit is now moved out of the clamping position and the blade member 18 returned to its starting position by reverse movement of the handle 65 to the position A.

The exposed length of strip may now be wound onto the reel 23 by turning the crank 30, and the cycle repeated. It is apparent that the strip may be separated along a perforation line or lines, as desired so as to permit removal and replacement of the reel 23 and processing of an exposed length or lengths, as desired.

The invention in its broader aspects is not limited to the specific mechanisms shown and described but departures may be made therefrom within the scope of the accompanying claims without departing from the principles of the invention and without sacrificing its chief advantages.

What I claim is:

1. A cassette for X-ray radiography with provision for handling and exposing successive lengths of a long strip of sensitized material, the cassette comprising a casing having an X-ray permeable window therein, winding reels within the casing, means for winding said strip off one reel and onto the other, means for clamping a length of said strip for exposure to X-rays through said window, and means for cutting said strip while clamped.

2. A cassette for X-ray radiography with provision for handling and exposing successive lengths of a long strip of sensitized material, the cassette comprising a casing having a rigid, curved X-ray permeable window therein, winding reels within the casing, means for winding said strip off one reel and onto the other, means including a clamping unit movable into and out of a predetermined clamping position for clamping a length of said strip against said rigid curved window for exposure to X-rays therethrough, and cutting means including a reciprocably mounted blade member within said casing actuable from the exterior thereof upon movement of said clamping means into said clamping position, for cutting said strip while clamped.

3. A cassette for X-ray radiography with provision for handling and exposing successive lengths of a long strip of sensitized material, the cassette comprising a casing having an X-ray permeable window therein, winding reels within the casing means for winding said strip off one reel and onto the other, means including a clamping unit movable into and out of a predetermined position for clamping a length of said strip for exposure to X-rays through said window, and means for perforating said strip while clamped.

4. In a cassette for X-ray radiography with provision for handling and exposing successive lengths of a long strip of sensitized material, the cassette comprising a casing, a rigid, curved X-ray permeable exposure window in said casing, means for clamping a length of said strip against said window for exposure to X-rays therethrough, said means comprising a rigid backing member, a mat of sponge rubber carried thereby, an intensifying screen covering said mat, and a thin metal shield member spacing said screen from said mat, said shield being adhesively bonded to said mat and said screen being secured at its marginal portions to said shield.

FRANK T. POWERS.